(12) United States Patent
Jomaa et al.

(10) Patent No.: US 10,882,396 B2
(45) Date of Patent: Jan. 5, 2021

(54) MOUNT ASSEMBLY WITH SWITCHABLE DISPLACEMENT ELEMENTS

(71) Applicant: GM Global Technology Operations LLC, Detroit, MI (US)

(72) Inventors: Sam M. Jomaa, Northville, MI (US); Wojciech E. Suchta, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 278 days.

(21) Appl. No.: 16/041,354

(22) Filed: Jul. 20, 2018

(65) Prior Publication Data

US 2020/0023731 A1    Jan. 23, 2020

(51) Int. Cl.
| | | |
|---|---|---|
| F16F 13/30 | (2006.01) | |
| B60K 17/00 | (2006.01) | |
| F16M 7/00 | (2006.01) | |
| F16F 13/10 | (2006.01) | |
| B62D 65/10 | (2006.01) | |

(52) U.S. Cl.
CPC ............. *B60K 17/00* (2013.01); *B62D 65/10* (2013.01); *F16F 13/10* (2013.01); *F16F 13/103* (2013.01); *F16F 13/305* (2013.01); *F16M 7/00* (2013.01); *F16F 2224/0208* (2013.01); *F16F 2224/045* (2013.01); *F16F 2226/04* (2013.01); *F16F 2228/066* (2013.01)

(58) Field of Classification Search
CPC .. B60K 5/1208; B60K 5/1283; B60K 5/1241; B60K 5/1291; F16F 3/10; F16F 3/101; F16F 3/102; F16F 3/105; F16F 3/106; F16F 3/107; F16F 2228/066; F16F 13/305; F16F 2224/045; F16F 9/535
See application file for complete search history.

(56) References Cited

U.S. PATENT DOCUMENTS

| | | | | |
|---|---|---|---|---|
| 4,657,232 A | * | 4/1987 | West ....................... | F16F 13/26 267/140.13 |
| 5,176,368 A | * | 1/1993 | Shtarkman .............. | F16F 13/16 188/267.2 |
| 6,267,362 B1 | * | 7/2001 | Satori .................... | F16F 13/103 267/140.13 |

(Continued)

*Primary Examiner* — Emma K Frick (57) ABSTRACT

A system and method using a mount assembly for attaching a powertrain to a structural member of a vehicle. The mount assembly includes a first compliant member, a second compliant member, a first fluid chamber, a second fluid chamber, a pressure compliant membrane, electro-magnetorheological switch and a magnetorheological fluid. A fluid conduit interconnects the first fluid chamber with the second fluid chamber to allow a fluid to pass from the first fluid chamber to the second fluid chamber. The pressure compliant membrane seals the aperture in the second fluid chamber. The electro-magnetorheological switch is activated to generate an electric field in the fluid conduit to change the viscosity of the magnetorheological fluid to achieve a first stiffness profile of the mount assembly. The electro-magnetorheological switch is deactivated to remove the electric field in the fluid conduit to change the viscosity of the magnetorheological fluid to achieve a second stiffness profile of the mount assembly.

19 Claims, 3 Drawing Sheets

(56) References Cited

U.S. PATENT DOCUMENTS

| | | | | |
|---|---|---|---|---|
| 6,364,295 B1* | 4/2002 | Wolf | F16F 13/10 | 267/140.14 |
| 6,622,995 B2* | 9/2003 | Baudendistel | F16F 13/305 | 267/140.14 |
| 7,052,003 B2* | 5/2006 | Ueki | F16F 13/107 | 267/140.13 |
| 7,063,191 B2* | 6/2006 | Hopkins | F16F 13/10 | 188/267.2 |
| 7,905,470 B2* | 3/2011 | Kojima | F16F 13/305 | 267/140.14 |
| 8,333,368 B2* | 12/2012 | Rooke | F16F 13/268 | 188/282.6 |
| 8,594,911 B2* | 11/2013 | Okamoto | F16F 13/264 | 267/140.15 |
| 8,973,704 B2* | 3/2015 | Kim | F16F 13/10 | 181/207 |
| 9,051,989 B2* | 6/2015 | Schumann | F16F 9/466 | |
| 9,074,653 B2* | 7/2015 | Gannon | B60K 5/1266 | |
| 9,074,654 B2* | 7/2015 | Ueki | F16F 13/107 | |
| 9,322,451 B2* | 4/2016 | Schumann | F16F 13/10 | |
| 9,587,704 B2* | 3/2017 | Lee | F16F 13/264 | |
| 9,707,836 B2* | 7/2017 | Sykes | F16F 1/3849 | |
| 9,719,575 B2* | 8/2017 | Kojima | B60K 5/1208 | |
| 9,969,230 B2* | 5/2018 | Isaac | B60G 13/003 | |
| 10,167,923 B2* | 1/2019 | Suchta | B60K 1/00 | |
| 10,403,422 B2* | 9/2019 | Biermann | H01F 1/447 | |
| 10,502,279 B2* | 12/2019 | Kojima | F16F 13/10 | |
| 2012/0090912 A1* | 4/2012 | Gannon | F16F 13/14 | 180/312 |
| 2012/0292837 A1* | 11/2012 | Hettler | F16F 13/108 | 267/140.11 |
| 2019/0048897 A1* | 2/2019 | Weber | F15B 1/08 | |
| 2019/0077243 A1* | 3/2019 | Grajeda | B60K 5/1208 | |
| 2019/0092155 A1* | 3/2019 | Inoue | F16F 13/102 | |
| 2020/0011396 A1* | 1/2020 | Nagashima | F16F 13/107 | |

* cited by examiner

MOUNT ASSEMBLY WITH SWITCHABLE DISPLACEMENT ELEMENTS

FIELD

The present disclosure relates generally to devices and methods for interconnecting a first structural member to a second structural member and, more particularly, to a mount assembly that has a stiffness profile for reducing the vibrations present in one of the structural members from being transmitted to the other structural member.

BACKGROUND

The statements in this section merely provide background information related to the present disclosure and may or may not constitute prior art.

A mount assembly is commonly found in motor vehicles. Mount assemblies have two primary functions. Firstly, the mount assembly is employed to secure a component of a vehicle, such as a powertrain, to the vehicle body or frame and, secondly, to reduce or eliminate the transmission of forces or vibrations present in the powertrain from propagating to the vehicle body or frame.

To achieve their primary functions, mount assemblies typically have a structural frame or bracket that supports a compliant member or rubber insert. The compliant member has a mounting feature that is configured to attach to the powertrain or other structural component. The structural frame of the mount assembly is configured to attach to the vehicle body or frame. The compliant member has a known spring stiffness profile that varies based on the displacement of the compliant member within the structural frame of the mount assembly. The spring stiffness profile of the compliant member is fixed and is not adaptable to changing operating conditions of the vehicle.

While conventional mount assemblies achieve their intended purpose there is a need in the art for an improved design for a mount assembly. The improved design should provide a mount assembly that, after being installed on a vehicle, is controllable such that a multiple stiffness profiles may be selected based on varying vehicle operating conditions.

SUMMARY

According to several aspects, a mount assembly for attaching a powertrain to a structural member of a vehicle is disclosed. The mount assembly includes a first support member having an attachment end attachable to the powertrain, a second support member having an attachment end attachable to the structural member of the vehicle, a first compliant member, a second compliant member, a second snubber member, a first fluid chamber, a second fluid chamber, a fluid conduit, a pressure compliant membrane, a magnetorheological fluid, and an electro-magnetorheological switch. The second support member is spaced apart from the first support member. The first compliant member includes a first attachment end fixed to the first support member, a second attachment end fixed to the second support member, and a first snubber member opposite the first attachment end. The second compliant member is fixed to the second support member and is space apart from the first snubber portion. The second snubber member is fixed to the second support member and spaced apart from the second compliant member. The first fluid chamber is defined by a surface of the second compliant member, a surface of the second support member and a surface of the second snubber member. The second fluid chamber is defined by a plurality of surfaces of the second support member. The fluid conduit interconnects the first fluid chamber with the second fluid chamber to allow a fluid to pass from the first fluid chamber to the second fluid chamber. The pressure compliant membrane is attached to the second support structure and seals the aperture in the at least one of the plurality of surfaces of the second support member. The magnetorheological fluid is disposed in the first fluid chamber, the second fluid chamber and the fluid conduit. The electro-magnetorheological switch is proximate a portion of the fluid conduit between the first and second fluid chambers for selectively generating an electric field to change the viscosity of the magnetorheological fluid.

In another aspect of the present disclosure, a third fluid chamber is provided adjacent the second fluid chamber to cover the pressure compliant membrane.

In another aspect of the present disclosure, the third fluid chamber has a vent port for expelling air disposed within the third fluid chamber.

In another aspect of the present disclosure, the electro-magnetorheological switch further includes an electric coil for generating an electric field in the portion of the fluid conduit.

In another aspect of the present disclosure, the second support member has an aperture at an end of the second support member.

In another aspect of the present disclosure, the first compliant member is an elongated member that spans the aperture and is attached to an inside surface of the aperture at a first end and to an opposing inside surface of the aperture at a second end.

In another aspect of the present disclosure, the second compliant member and the second snubber member are formed as a unitary member.

In another aspect of the present disclosure, the first fluid chamber is a bladder formed within the unitary member.

In another aspect of the present disclosure, the fluid conduit is formed in the second support member and interconnects the bladder with the second fluid chamber.

In another aspect of the present disclosure, the pressure compliant membrane is a flexible membrane that under pressure produced by the fluid in the second chamber protrudes into the third chamber to increase a volume of the second fluid chamber.

In another aspect of the present disclosure, a method for attaching a powertrain to a structural member of a vehicle using a mount assembly is disclosed. The method includes providing a first support member, providing a second support member, providing a first compliant member, providing a second compliant member, providing a second snubber member, providing a first fluid chamber, providing a second fluid chamber, interconnecting the first fluid chamber with the second fluid chamber, sealing the aperture in the at least one of the plurality of surfaces of the second support member, determining a desired stiffness profile of the mount assembly, activating an electro-magnetorheological switch to generate an electric field in the fluid conduit to change the viscosity of the magnetorheological fluid to achieve a first stiffness profile of the mount assembly and deactivating the electro-magnetorheological switch to remove an electric field in the fluid conduit to change the viscosity of the magnetorheological fluid to achieve a second stiffness profile of the mount assembly.

In yet another aspect of the present disclosure, determining a desired stiffness level of the mount assembly further includes determining whether the first stiffness profile is desired based on an operating condition of the vehicle.

In yet another aspect of the present disclosure, determining a desired stiffness level of the mount assembly further includes determining whether the second stiffness profile is desired based on an operating condition of the vehicle.

In yet another aspect of the present disclosure, sealing the aperture in the at least one of the plurality of surfaces of the second support member further includes preventing the pressure compliant membrane from protruding out of the second fluid chamber when the first stiffness profile is desired.

In yet another aspect of the present disclosure, sealing the aperture in the at least one of the plurality of surfaces of the second support member with a pressure compliant membrane further includes allowing the pressure compliant membrane to protrude out of the second fluid chamber when the second stiffness profile is desired.

In yet another aspect of the present disclosure, activating the electro-magnetorheological switch to generate an electric field in the fluid conduit to change the viscosity of the magnetorheological fluid further includes changing the viscosity of the fluid to a viscoelastic solid to prevent the fluid from passing from the first fluid chamber to the second fluid chamber.

In yet another aspect of the present disclosure, deactivating the electro-magnetorheological switch to remove an electric field in the fluid conduit to change the viscosity of the magnetorheological fluid further includes changing the viscosity of the fluid to a viscosity that allows the fluid to pass from the first fluid chamber to the second fluid chamber.

In yet another aspect of the present disclosure, the method further includes providing a third fluid chamber adjacent the second fluid chamber to cover the pressure compliant membrane.

In yet another aspect of the present disclosure, providing a third fluid chamber adjacent the second fluid chamber further includes providing a vent port in the third fluid chamber for expelling air disposed within the third fluid chamber.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
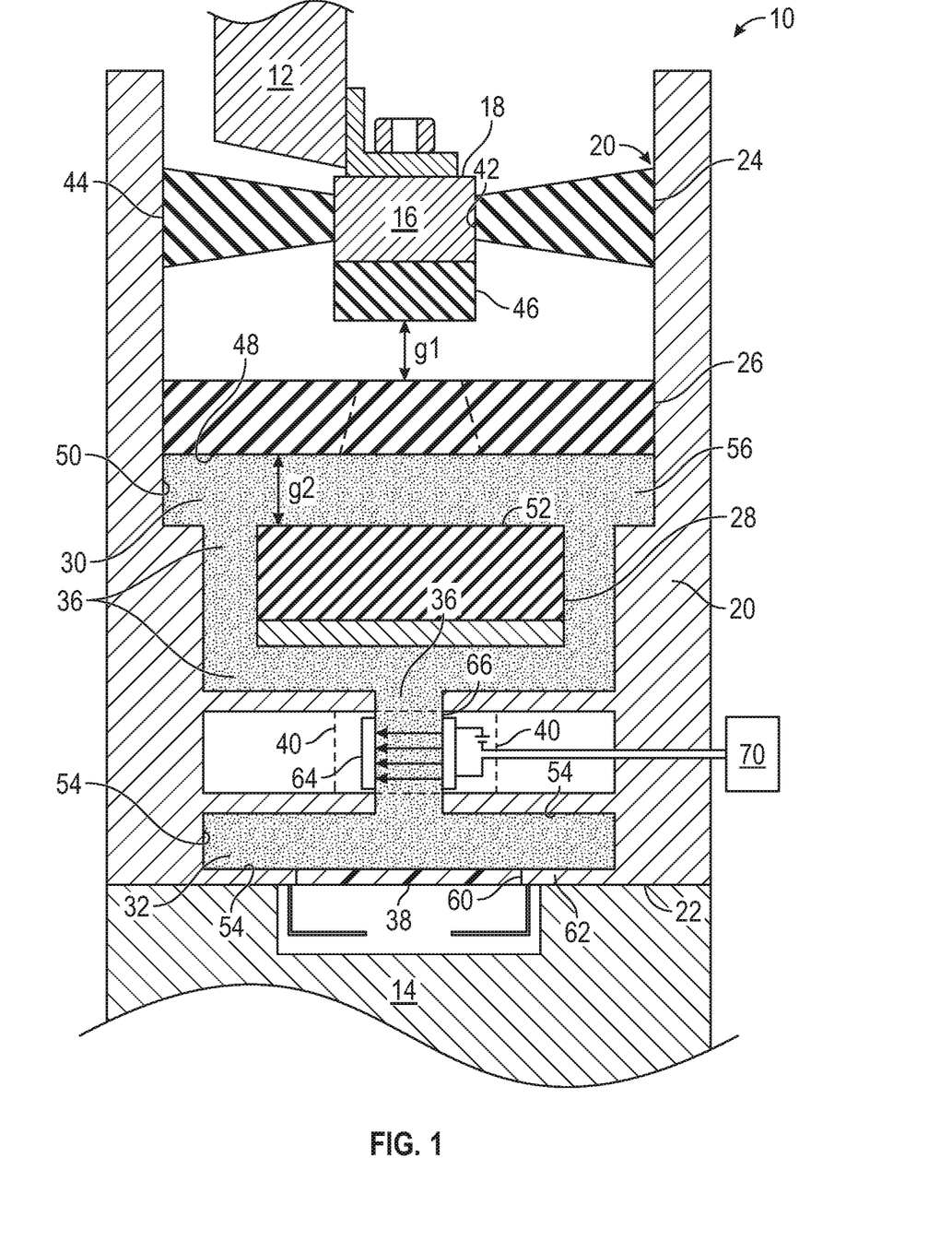
FIG. 1 is a schematic of a mount assembly, in accordance with one aspect of the invention.

With reference to FIG. 1, a schematic of a mount assembly 10 is illustrated in accordance with the present invention. Mount assembly 10 is configured to attach a first structure 12, such as a powertrain, to a second structure 14, such as a structural member of a vehicle. Mount assembly 10 has a first support member 16 that has an attachment end 18 attachable to the powertrain or first structure 12 and a second support member 20 having an attachment end 22 attachable to second structure 14 or the structural member of the vehicle. The second support member 20 is spaced apart from the first support member 16. As will become clear from the present disclosure, mount assembly 10 is configured to reduce or eliminate the transmission of forces or vibrations generated in one of the members to the other member. In one example, the first support member 16 is a metal block or the like that is configured to attached to the first structure or powertrain 12 through an attachment means such as a bolt and a threaded aperture in the metal block. Similarly, second support structure 20 is a metal housing that has at attachment end 22 that is attachable to a vehicle structure such as a vehicle frame or beam.

Mount assembly 10 further includes a first compliant member 24, a second compliant member 26, a second snubber member 28, a first fluid chamber 30, a second fluid chamber 32, a fluid conduit 36 interconnecting the first fluid chamber with the second fluid chamber, a pressure compliant membrane 38, and electro-magnetorheological (EMR) switch 40, as described in further detail below.

The first compliant member 24 has a first attachment end or surface 42 fixed to first support member 16 and a second attachment end 44 fixed to the second support member 20. First attachment end or surface 42 may be fixed or secured to first support member 16 by over-molding or insert molding. Likewise, second attachment end 44 may be fixed or secured to second support member 20 by over-molding or insert molding or other suitable means. The first compliant member 24 is made of rubber or like material that has a known stiffness value $K_{sm}$. Additionally, a first snubber member 46 is attached to the first support member 16 or metal block opposite the attachment end 18. Snubber member 46 may be fixed or secured to the first support member 16 or metal block by over-molding or insert molding or other suitable means. Snubber member 46 is made of rubber or like material that has a known stiffness value $K_{S1}$.

The second compliant member 26 is fixed to the second support member 20 and spaced apart from the first snubber member by a distance $g_1$. Second compliant member 26 is made of rubber or like material that has a known stiffness value $Ks_2$. Second compliant member 26 may be fixed or secured to second support member 20 by over-molding or insert molding or other suitable means.

The second snubber member 28 is fixed to the second support member 20 and spaced apart from the second compliant member 26 by a distance $g_2$. Second snubber member 28 is made of rubber or like material that has a known stiffness value $K_{sn}$. Second snubber member 28 may be fixed or secured to second support member 20 by over-molding or insert molding or other suitable means.

The first fluid chamber 30 is provided in mount assembly 10 for holding a volume of fluid such as magnetorheological (MR) fluid 56 between the second compliant member 26 and the second snubber member 28. A surface 48 of the second compliant member 26, a surface 50 of the second support member 20 and a surface 52 of the second snubber member 28 define the first fluid chamber 30.

The second fluid chamber 32 is provided in mount assembly 10 for receiving a volume of fluid from first fluid chamber 30. A plurality of surfaces 54 of the second support member 20 define second fluid chamber 32. The fluid conduit 36 interconnects the first fluid chamber 30 with the second fluid chamber 32 to allow the fluid 56 to pass from the first fluid chamber 30 to the second fluid chamber 32. An opening or aperture 60 is disposed in an end wall 62 of the second support member 20.

Attached to the second support member 20 and disposed across the opening 60 in the end wall 62 is the pressure compliant membrane 38. The pressure compliant membrane 38 seals the opening 60 of the second support member 20 preventing MR fluid 56 from exiting the second fluid chamber 32. However, the pressure compliant membrane 38 is a flexible membrane that under pressure produced by the MR fluid 56 in the second chamber 32 protrudes past the end wall 62 effectively increasing the volume of the second fluid chamber 32 and allowing the volume to decrease in the first fluid chamber 30. The pressure compliant membrane 38 is made of a non-porous material such as rubber or the like.

The electro-magnetorheological (EMR) switch 40 is disposed between the first fluid chamber 30 and the second fluid chamber 32. EMR switch 40 includes a controlled electrical coil 64 that generates a magnetic flux around the portion 66 of the fluid conduit 36 between the first fluid chamber 30 and the second fluid chamber 32. Additionally, the mount assembly 10 utilizes a control system 70 in electrical communication with coil 64 to control the magnetic field around the fluid conduit 36. When subjected to a magnetic field generated by controlled electrical coil 64, an apparent viscosity of the MR fluid 56 variably increases to a point in which the MR fluid 56 becomes a viscoelastic solid. When the MR fluid 56 is restricted from motion by the EMR switch 40, the MR fluid 56 becomes incompressible and locks or restricts the motion of the secondary rubber element 26 with the motion restricting secondary snubber member 28, effectively significantly increasing the combined effective stiffness of mount assembly 10. Controls system 70 determines an appropriate overall stiffness level for the mount assembly 10 based on vehicle operating conditions, such as, engine speed, vehicle speed, vehicle body movement, etc.

The mount assembly 10 is capable of achieving two different stiffness profiles. A first stiffness profile is achieved by sending a control signal to the EMR switch 40 to control the coil 64 to reduce or remove the electric field generated by coil 64 allowing the MR fluid to flow from the first chamber 30 to the second chamber 32. A first linear stiffness level of first stiffness profile is present in the mount 10 until the first compliant member 24 is displaced the distance g1. A second linear stiffness level of first stiffness profile is achieved in mount 10 when the first compliant member 24 is displaced the distance g1 and until the second compliant member 26 is displaced a distance g2. After the first compliant member 24 is displaced the distance g1 and second compliant member 26 is displaced a distance g2 the stiffness level of first stiffness profile increases non-linearly according to the combined stiffness $K_{sm}$, $K_{s1}$, $K_{s2}$, and $K_{sn}$ with the additional displacement of first compliant member 24 and second compliant member 26. Since the fluid in first fluid chamber 30 is allowed to flow to the second fluid chamber 32, forces are not transmitted from the second compliant member 26 through the MR fluid 56 to the secondary snubber member 28.

A second stiffness profile is achieved in mount assembly 10 by sending a control signal to the EMR switch 40 to control the coil 64 to increase the electric field generated by coil 64. The electric field generated by coil 64 causes the viscosity of the MR fluid 56 in the portion 66 of the fluid conduit 36 to increase and restrict the MR fluid 56 from flowing from the first chamber 30 to the second chamber 32. A first linear stiffness level of second stiffness profile is present in the mount assembly 10 until the first compliant member 24 is displaced the distance g1. After the first compliant member 24 is displaced the distance g1 the stiffness level of second stiffness profile increases non-linearly according to the combined stiffness of $K_{sm}$, $K_{s1}$, $K_{s2}$, and $K_{sn}$ since the forces are transmitted from the secondary rubber element 26 through the MR fluid 56 to secondary snubber member 28 as the fluid in first fluid chamber 30 is prevented from flowing to the second fluid chamber 32 and the MR fluid 56 is incompressible.

Figure 2A:
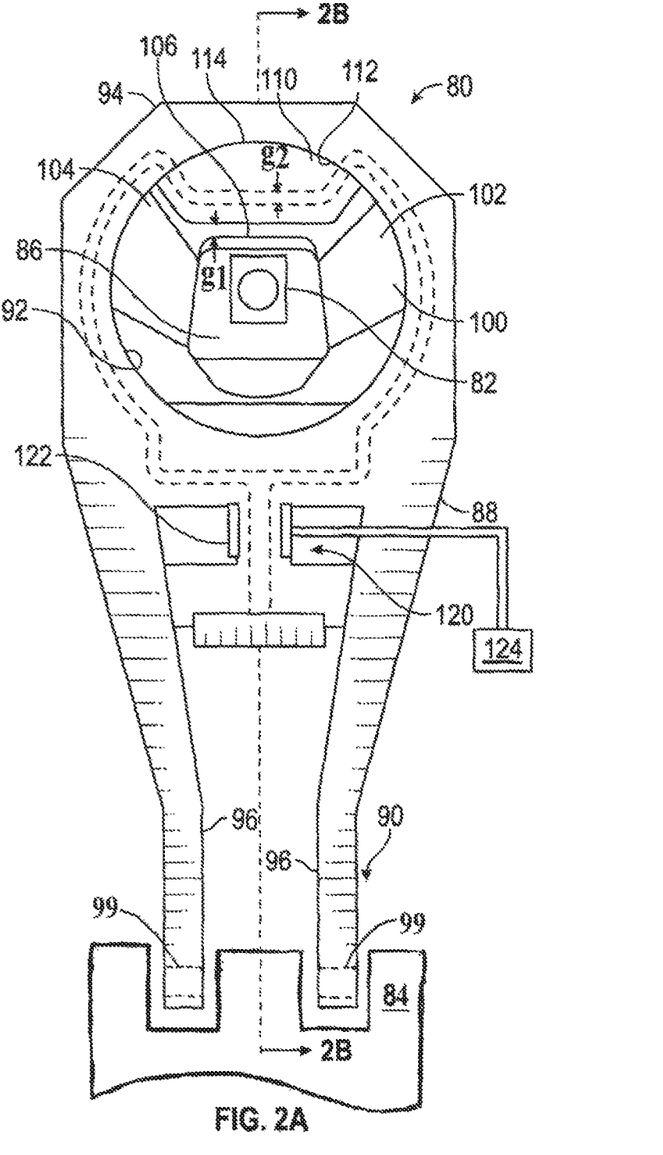
FIG. 2a is a perspective view of a torque strut utilizing the mount assembly, in accordance with an aspect of the present invention.

Referring now to FIG. 2a, a perspective view of a torque strut 80 utilizing the mount assembly 10 described above is illustrated, in accordance with an embodiment of the present invention. Strut 80 is configured to attach a structural member of a vehicle 82 to a structural member of a powertrain 84. Strut 80 has a mounting block 86 that is attachable to the structural member of the vehicle 82 and a strut body 88 having an attachment end 90 attachable to the structural member of the powertrain 84. The strut body 88 is an elongated structural member having an aperture 92 at an opposite end 94 of the strut body 88 relative to the attachment end 90. As will become clear from the present disclosure, strut 80 is configured to reduce or eliminate forces or vibrations generated in the vehicle 82 from being transmitted to the structural member of the powertrain 84. Mounting block 86, for example, is a metal block or the like that is configured to attach to the structural member of the vehicle 82 through an attachment means such as a bolt and a threaded aperture in the metal block. Similarly, strut body 88 is a metal bracket that has at attachment end 90 having a pair of flanges 96 that have apertures 99 that are attachable, in a conventional way, to the structural member of the powertrain 84.

Strut 80 has a main rubber element 100 that is an elongated member that spans the aperture 92 and is attached to an inside surface of aperture 92 at a first end 102 and to an opposing inside surface of the aperture 92 at a second end 104. Mounting block 86 is fixed or secured to main rubber element 100 by over-molding or insert molding. Likewise, the first and second ends 102, 104 of the main rubber element 100 are fixed or secured to the strut body 88 by over-molding or insert molding or other suitable means. The main rubber element 100 is made of rubber or like material that has a known stiffness value Ksm. Additionally, a first snubber member 106 is attached to the mounting block 86. First snubber member 106 may be fixed or secured to the mounting block 86 by over-molding or insert molding or other suitable means. First snubber member 106 is made of rubber or like material that has a known stiffness value $K_{S1}$. Strut 80 further includes a secondary rubber element 110 that is also disposed in aperture 92 and is attached to an inside surface 112 of aperture 92 at an end 114. Secondary rubber element 110 is made of rubber or like material that has a known stiffness value $K_{S2}$.

Additionally, an electro-magnetorheological (EMR) switch 120 is provided in strut 80. EMR switch 120 includes a controlled electrical coil 122 that generates a magnetic field to selectively change the stiffness level of strut 80. A controls system 124 in electrical communication with coil 122 controls the magnetic field generated by coil 122. Control system 124 determines an appropriate overall stiffness level for the strut 80 based on vehicle operating conditions, such as, engine speed, vehicle speed, vehicle body movement, etc.

Figure 2B:
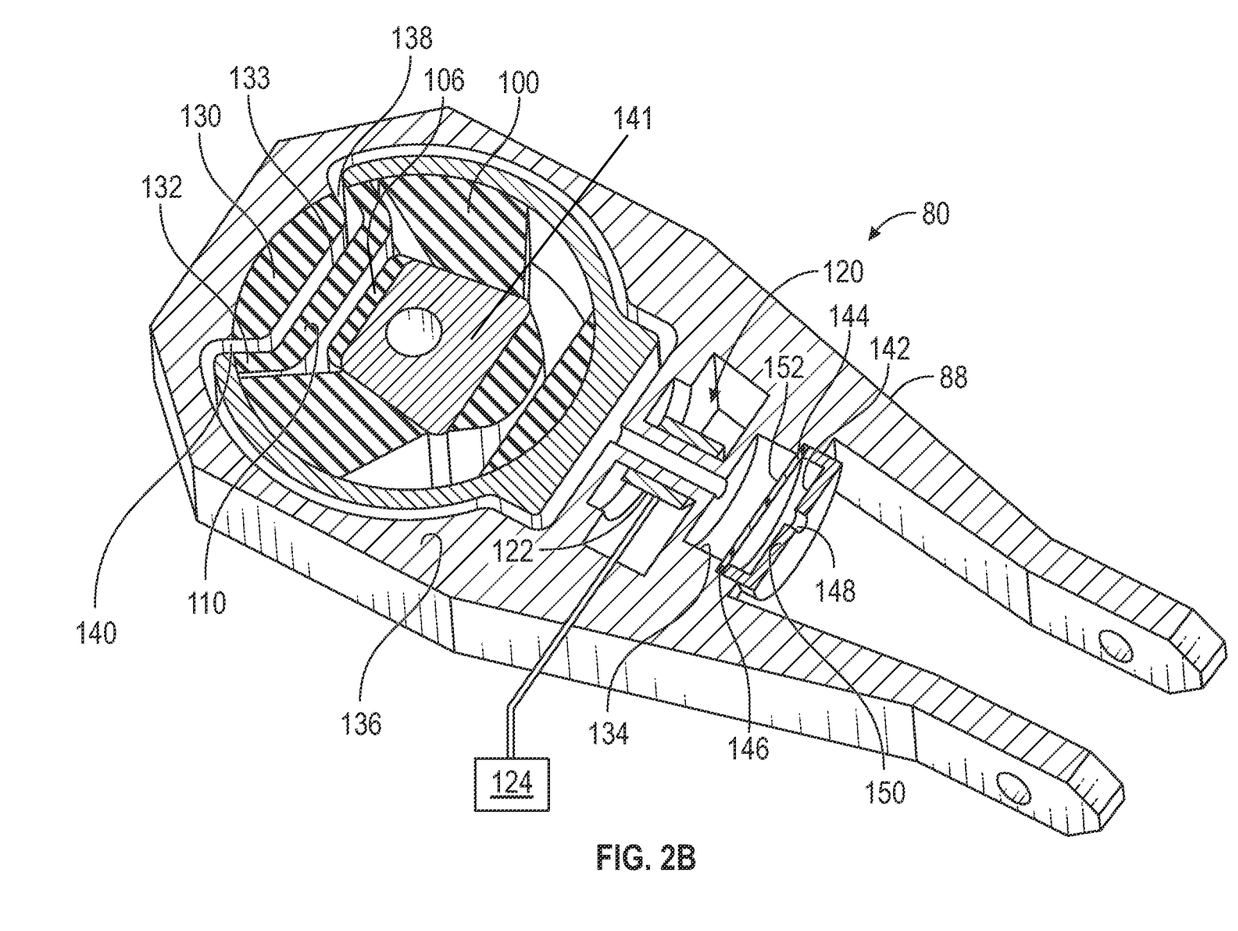
FIG. 2b is a cross-sectional view through the torque strut along line 2b shown in FIG. 2a, in accordance with an aspect of the present invention.

Referring now to FIG. 2b, a cross-sectional view through torque strut 80 along line 2b shown in FIG. 2a is illustrated, in accordance with an embodiment of the present invention. Integrated within secondary rubber element 110 is a secondary snubber element 130. Secondary snubber element 130 is made of rubber or like material that has a known stiffness value $K_{Sn}$.

As further illustrated in FIG. 2b, strut 80 has three fluid chambers 132, 134 and 142. The first fluid chamber 132 is a fluid stiffness modulation chamber and is provided in secondary rubber element 110 for holding a volume of fluid, such as magnetorheological (MR) fluid 133. The first fluid chamber 132 is a bladder or cavity formed in secondary rubber element 110 adjacent the secondary snubber element 130.

The second fluid chamber 134 is a fluid expansion chamber and is formed in the strut body 88 for receiving a flow of MR fluid 133 from first fluid chamber 132. A fluid conduit or channel 136 is formed in the strut body 88. Fluid conduit or channel 136 interconnects a pair of ports 138, 140 formed in the strut body 88 with the second fluid chamber 134. Ports 138, 140 are in fluid communication with the first fluid chamber 132 to allow the fluid to pass from the first fluid chamber 132 to the second fluid chamber 134. Wrapped around a portion 141 of the fluid conduit 136 disposed between the first and second fluid chambers 132, 134 is the electric coil of the EMR switch 120.

The third fluid chamber 142 is adjacent the second fluid chamber 134. Third fluid chamber 142 has an opening or aperture 144 disposed in a dividing wall 146 between the second and a third fluid chambers 134, 142. Opposite opening 144, a vent port 148 is provided through an exterior wall 150 of the strut body 88. Vent port 148 is an open port or aperture that is open to the ambient environment. Disposed across the opening 144 in the dividing wall 146 is a pressure compliant membrane 152. The pressure compliant membrane 152 seals the opening 144 between the second fluid chamber 134 and the third fluid chamber 142 preventing fluid from passing from the second fluid chamber 134 to the third fluid chamber 142. The pressure compliant membrane 152 is a flexible membrane that under pressure produced by the MR fluid 133 in the second chamber 134 protrudes into the third chamber 142 effectively increasing the volume of the second fluid chamber 134 and allowing the volume to decrease in the first fluid chamber 132. As the compliant membrane 152 protrudes into the third chamber 142 air in the third chamber 142 is forced out the vent port 148. The pressure compliant membrane 152 is made of a non-porous material such as rubber or the like.

The present invention further contemplates a method for changing the overall stiffness of the strut 80 from a first stiffness profile to a second stiffness profile. The first stiffness profile is achieved by sending a control signal to the electro-magnetorheological (EMR) switch 120 to deactivate the electrical coil 122 and turn off the magnetic field. When the electric field generated by electrical coil 122 is not present in portion 141 of the fluid conduit 136 the MR fluid 133 is less viscous and is free to flow from the first chamber to the second chamber as the compliant member 152 flexes and protrudes into the third fluid chamber 136. A first linear stiffness level of first stiffness profile is present in the strut 80 until the main rubber element 100 is displaced the distance g1. A second linear stiffness level of first stiffness profile is achieved in strut 80 when the main rubber element 100 is displaced the distance g1 and until the secondary rubber element 110 is displaced a distance g2. After the main rubber element 100 is displaced the distance g1 and secondary rubber element 110 is displaced a distance g2 the stiffness level of first stiffness profile increases non-linearly according to the combined stiffness $K_{sm}$, $K_{s1}$, $K_{s2}$, and $K_{sn}$ with additional displacement of main rubber element 100 and secondary rubber element 110.

A second stiffness profile is achieved in strut 80 by sending a control signal to the electro-magnetorheological (EMR) switch 120 to activate the electrical coil 122 and generate a magnetic field. When the MR fluid 133 in portion 141 of fluid conduit 136 is subjected to the magnetic field generated by the electrical coil 122, an apparent viscosity of the MR fluid 133 variably increases to a point in which the MR fluid 133 becomes a viscoelastic solid. Viscoelastic solid state of the MR fluid 133 in portion 141 of fluid conduit 136 restricts the flow of the MR fluid 133 from moving out of first chamber 132 and into second chamber 134. The MR fluid 133 is incompressible and locks or restricts the motion of the secondary rubber element 110 with the motion restricting secondary snubber member 130, effectively significantly increasing the combined effective stiffness of mount assembly 80. Essentially, the volume of fluid in the first chamber 132 is held fixed such that as the main rubber element 100 is displaced the distance g1 and contacts the secondary rubber element 110. The incompressible MR fluid 133 transmits the forces from the secondary rubber element 110 through the MR fluid 133 to secondary snubber element 130.

A first linear stiffness level of second stiffness profile is present in the strut 80 until the main rubber element 100 is displaced the distance g1. After the main rubber element 100 is displaced the distance g1 the stiffness level of second stiffness profile increases non-linearly according to the combined stiffness of $K_{sm}$, $K_{s1}$, $K_{s2}$, and $K_{sn}$ with additional displacement of main rubber element 100 and secondary rubber element 110.

Advantageously, the system and method of the present disclosure provides a mount assembly that has more than one stiffness profile. Moreover, the desired stiffness profile is selectable based on varying operating conditions of the vehicle. Many additional benefits over conventional mount assemblies will be apparent from the above disclosure.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A mount assembly for attaching a powertrain to a structural member of a vehicle, the mount assembly comprising:
   a first support member having an attachment end attachable to the powertrain;
   a second support member having an attachment end attachable to the structural member of the vehicle, wherein the second support member is spaced apart from the first support member;
   a first compliant member having:
     a first attachment end fixed to the first support member;
     a second attachment end fixed to the second support member; and
     a first snubber member opposite the attachment end of the first support member;
   a second compliant member fixed to the second support member, wherein the second compliant member is spaced apart from the first snubber member;
   a second snubber member fixed to the second support member and spaced apart from the second compliant member;

a first fluid chamber defined by a surface of the second compliant member, a surface of the second support member and a surface of the second snubber member; and a second fluid chamber defined by a plurality of surfaces of the second support member and having an aperture in at least one of the plurality of surfaces of the second support member;

a fluid conduit interconnecting the first fluid chamber with the second fluid chamber to allow a fluid to pass from the first fluid chamber to the second fluid chamber;

a pressure compliant membrane attached to the second support member, wherein pressure compliant membrane seals the aperture in the at least one of the plurality of surfaces of the second support member; and a magnetorheological fluid disposed in the first fluid chamber, the second fluid chamber and the fluid conduit;

an electro-magnetorheological switch proximate a portion of the fluid conduit between the first and second fluid chambers for selectively generating an electric field to change a viscosity of the magnetorheological fluid.

2. The mount assembly of claim 1, further comprising a third fluid chamber adjacent the second fluid chamber to cover the pressure compliant membrane.

3. The mount assembly of claim 2, wherein the third fluid chamber has a vent port for expelling air disposed within the third fluid chamber.

4. The mount assembly of claim 3, wherein the electro-magnetorheological switch further comprises an electric coil for generating an electric field in the portion of the fluid conduit.

5. The mount assembly of claim 2, wherein the pressure compliant membrane is a flexible membrane that under pressure produced by the fluid in the second fluid chamber protrudes into the third fluid chamber to increase a volume of the second fluid chamber.

6. The mount assembly of claim 1, wherein the second support member has a second aperture at an end of the second support member.

7. The mount assembly of claim 6, wherein the first compliant member is an elongated member that spans the aperture and is attached to an inside surface of the aperture at a first end and to an opposing inside surface of the aperture at a second end.

8. The mount assembly of claim 1, wherein the second compliant member and the second snubber member are formed as a unitary member.

9. The mount assembly of claim 8, wherein first fluid chamber is a bladder formed within the unitary member.

10. The mount assembly of claim 9, wherein the fluid conduit is formed in the second support member and interconnects the bladder with the second fluid chamber.

11. A method for attaching a powertrain to a structural member of a vehicle using a mount assembly, the method comprising:

providing a first support member having an attachment end attachable to the powertrain;

providing a second support member having an attachment end attachable to the structural member of the vehicle, wherein the second support member is spaced apart from the first support member;

providing a first compliant member having:
a first attachment end fixed to the first support member;
a second attachment end fixed to the second support member; and a first snubber member opposite the attachment end of the first support member;

providing a second compliant member fixed to the second support member, wherein the second compliant member is spaced apart from the first snubber member;

providing a second snubber member fixed to the second support member and spaced apart from the second compliant member;

providing a first fluid chamber defined by a surface of the second compliant member, a surface of the second support member and a surface of the second snubber member; and providing a second fluid chamber defined by a plurality of surfaces of the second support member and having an aperture in at least one of the plurality of surfaces of the second support member;

interconnecting the first fluid chamber with the second fluid chamber with a fluid conduit to allow a magnetorheological fluid disposed in the first fluid chamber to pass to the second fluid chamber;

sealing the aperture in the at least one of the plurality of surfaces of the second support member with a pressure compliant membrane;

determining a desired stiffness profile of the mount assembly;

activating an electro-magnetorheological switch to generate an electric field in the fluid conduit to change a viscosity of the magnetorheological fluid to achieve a first stiffness profile of the mount assembly; and deactivating the electro-magnetorheological switch to remove the electric field in the fluid conduit to change the viscosity of the magnetorheological fluid to achieve a second stiffness profile of the mount assembly.

12. The method of claim 11, wherein determining a desired stiffness profile of the mount assembly further comprises determining whether the first stiffness profile is desired based on an operating condition of the vehicle.

13. The method of claim 11, wherein determining a desired stiffness profile of the mount assembly further comprises determining whether the second stiffness profile is desired based on an operating condition of the vehicle.

14. The method of claim 11, wherein sealing the aperture in the at least one of the plurality of surfaces of the second support member further comprises preventing the pressure compliant membrane from protruding out of the second fluid chamber when the first stiffness profile is desired.

15. The method of claim 11, wherein sealing the aperture in the at least one of the plurality of surfaces of the second support member with a pressure compliant membrane further comprises allowing the pressure compliant membrane to protrude out of the second fluid chamber when the second stiffness profile is desired.

16. The method of claim 11, wherein activating the electro-magnetorheological switch to generate an electric field in the fluid conduit to change the viscosity of the magnetorheological fluid further comprises changing the viscosity of the fluid to a viscoelastic solid to prevent the fluid from passing from the first fluid chamber to the second fluid chamber.

17. The method of claim 11, wherein deactivating the electro-magnetorheological switch to remove an electric field in the fluid conduit to change the viscosity of the magnetorheological fluid further comprises changing the viscosity of the fluid to a viscosity that allows the fluid to pass from the first fluid chamber to the second fluid chamber.

18. The method of claim 11, further comprising providing a third fluid chamber adjacent the second fluid chamber to cover the pressure compliant membrane.

19. The method of claim 18, wherein providing a third fluid chamber adjacent the second fluid chamber further includes providing a vent port in the third fluid chamber for expelling air disposed within the third fluid chamber.

* * * * *